USOO5953520A

United States Patent [19]

Mallick

[11] Patent Number: 5,953,520
[45] Date of Patent: Sep. 14, 1999

[54] ADDRESS TRANSLATION BUFFER FOR DATA PROCESSING SYSTEM EMULATION MODE

[75] Inventor: Soummya Mallick, Austin, Tex.

[73] Assignee: International Business Machines Corporation, Armonk, N.Y.

[21] Appl. No.: 08/934,645

[22] Filed: Sep. 22, 1997

[51] Int. Cl.[6] .................................................. G06F 9/455
[52] U.S. Cl. ........................................... 395/500.47
[58] Field of Search .................................... 395/568, 385, 395/500

[56] References Cited

U.S. PATENT DOCUMENTS

| | | | |
|---|---|---|---|
| 5,339,417 | 8/1994 | Connell et al. | 395/650 |
| 5,574,873 | 11/1996 | Davidian | 395/376 |
| 5,742,802 | 4/1998 | Harter et al. | 395/568 |
| 5,790,825 | 11/1995 | Traut | 395/385 |

Primary Examiner—Kevin J. Teska
Assistant Examiner—Ayni Mohamed
Attorney, Agent, or Firm—Casimer K. Salys; Brian F. Russell; Andrew J. Dillon

[57] ABSTRACT

A processor and method of operating a processor which has a native instruction set and emulates instructions in a guest instruction set are described. According to the method, a series of guest instructions from the guest instruction set are stored in memory. The series includes a guest memory access instruction that indicates a guest logical address in guest address space. For each guest instruction in the series, a semantic routine of native instructions from the native instruction set is stored in memory. The semantic routines, which utilize native addresses in native address space, can be executed in order to emulate the guest instructions. In response to receipt of the guest memory access instruction for emulation, the guest logical address is translated into a guest real address, which is thereafter translated into a native physical address. A semantic routine that emulates the guest memory access instruction is then executed utilizing the native physical address.

16 Claims, 9 Drawing Sheets

ADDRESS TRANSLATION BUFFER FOR DATA PROCESSING SYSTEM EMULATION MODE

CROSS-REFERENCE TO RELATED APPLICATIONS

The subject matter of this application is related to that disclosed in the following applications, which are assigned to the assignee of the present application and are incorporated herein by reference:

Ser. No. (08,934,644) now U.S. Pat. No. 5,870,575, filed of even date herewith, for INDIRECT UNCONDITIONAL BRANCHES IN DATA PROCESSING SYSTEM EMULATION MODE, by James A. Kahle and Soummya Mallick.

Ser. No. 08/934,857, filed of even date herewith, for METHOD AND SYSTEM FOR PROCESSING BRANCH INSTRUCTIONS DURING EMULATION IN A DATA PROCESSING SYSTEM, by James A. Kahle and Soummya Mallick.

Ser. No. 08/935,007, filed of even date herewith, for METHOD AND SYSTEM FOR INTERRUPT HANDLING DURING EMULATION IN A DATA PROCESSING SYSTEM, by James A. Kahle and Soummya Mallick.

Ser. No. 08/591,291, filed Jan. 25, 1996, for A METHOD AND SYSTEM FOR MINIMIZING THE NUMBER OF CYCLES REQUIRED TO EXECUTE SEMANTIC ROUTINES, by Soummya Mallick.

Ser. No. 08/581,793, filed Jan. 25, 1996, for A METHOD AND SYSTEM FOR IMPROVING EMULATION PERFORMANCE BY PROVIDING INSTRUCTIONS THAT OPERATE ON SPECIAL-PURPOSE REGISTER CONTENTS, by Soummya Mallick.

BACKGROUND OF THE INVENTION

1. Technical Field

The present invention relates in general to a method and system for data processing and, in particular, to a method and system for emulating differing architectures in a data processing system. Still more particularly, the present invention relates to a method and system for address translation during emulation of guest instructions in a data processing system.

2. Description of the Related Art

The PowerPC™ architecture is a high-performance reduced instruction set (RISC) processor architecture that provides a definition of the instruction set, registers, addressing modes, and the like, for a family of computer systems. The PowerPC™ architecture is somewhat independent of the particular construction of the microprocessor chips or chips utilized to implement an instance of the architecture and has accordingly been constructed in various implementations, including the PowerPC 601™, 602™, 603™, and 604™. The design and operation of these processors have been described in published manuals such as the *PowerPC 604™ RISC Microprocessor User's Manual*, which is available from IBM Microelectronics as Order No. MPR604UMU-01 and is incorporated herein by reference.

As is true for many contemporary processors, a RISC architecture was chosen for the PowerPC™ because of the inherently higher performance potential of RISC architectures compared to CISC (complex instruction set computer) architectures. While it is desirable to optimize the design of a RISC processor to maximize the performance of the processor when executing native RISC instructions, it is also desirable to promote compatibility by accommodating commercial software written for CISC processors such as the Intel x86 and Motorola 68K.

Accordingly, an emulator mechanism can be incorporated into a PowerPC™ processor as disclosed in above-referenced Ser. No. 08/591,291 now U.S. Pat. No. 5,732,235 and Ser. No. 08/581,793 now U.S. Pat. No. 5,758,140. The disclosed emulation mechanism allows guest instructions (e.g., variable-length CISC instructions) to be emulated by executing corresponding semantic routines formed from native RISC instructions. Thus, the processor is required to manage two distinct instruction streams: a guest instruction stream containing the instructions to be emulated and a native instruction stream containing the native instructions within the semantic routines utilized to emulate the guest instructions. In order to maintain high performance when emulating guest instructions, an efficient mechanism is needed within the processor for managing both the guest and native instruction steams, with provision for branching, address translation buffer management, and exception handling.

The architecture of the Intel x86 line of microprocessors is described in *Microprocessors. Vol. I and Vol. II,* 1993, published by Intel Corporation as Publ. No. 230843. The Intel x86 instruction set is characterized in that the instructions are of variable length, from one byte in length to several bytes, and that arithmetic and logic operations can include a memory access (i.e., the operations can be memory-to-memory operations). In addition, complex addressing modes such as memory indirect are allowed. The architecture of the Motorola 68K line of microprocessors, which is described in various published documents such as *MC68030—Enhanced 32-bit Microprocessor User's Manual*, Prentice Hall, 1990, similarly uses complex addressing modes and variable-length instructions that can specify memory-to-memory operations.

The differences between RISC and CISC instruction sets also results in the utilization of diverse memory management methods and structures. For example, the Intel x86 architecture implements memory segmentation and paging in a manner that permits variable-length segments, while the PowerPC™ architecture employs fixed-length memory segments. Due to this and many other differences between the segmentation and paging mechanisms of the PowerPC and x86 architectures, the contents of page table and translation buffer entries are calculated using quite different logic.

Accordingly, the present invention includes the recognition that it would be desirable to provide a method and apparatus that permit a native (e.g., PowerPC™) architecture to use page table and translation buffer entries that are tailored to the memory management scheme of the guest (e.g., x86) instructions while performing the actual access to physical memory utilizing the native addressing mechanism.

SUMMARY OF THE INVENTION

It is therefore one object of the present invention to provide an improved method and system for data processing.

It is another object of the present invention to provide a method and system for a method and system for emulating differing architectures in a data processing system.

It is yet another object of the present invention to provide a method and system for address translation during emulation of guest instructions in a data processing system.

The foregoing objects are achieved as is now described. According to one embodiment, an emulation mechanism for a host computer system allows guest instructions to be executed by semantic routines made up of native instructions. The native instructions for the host processor are of a particular format, such as that specified by a RISC architecture, whereas the guest instructions are in a format for a different computer architecture, such as variable-length CISC instructions. The processor includes an emulator unit for fetching and processing the guest instructions that utilizes a multiple-entry queue to store the guest instructions currently fetched in order of receipt. Each entry in the queue includes an offset that indicates the location in memory of the semantic routine for the associated guest instruction, immediate data (if any) for the guest instruction, the length of the corresponding semantic routine, a condition field indicating results of arithmetic/logic operations by a guest instruction, valid bits, and other pertinent data. The processor executes a semantic routine in response to the entries in the queue, using the content of the entry to fetch the semantic routine. An entry is removed from the queue when the semantic routine for the associated guest instruction has been completed by the processor.

The memory management scheme for the guest instructions is different from that of the native instructions; accordingly, the translation of guest virtual addresses to guest real addresses is based on a different logic scheme. According to the present invention, a guest logical address is translated into a guest real address, which is thereafter translated into a native physical address. A semantic routine that emulates a guest instruction that accesses memory can then be executed utilizing the native physical address.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
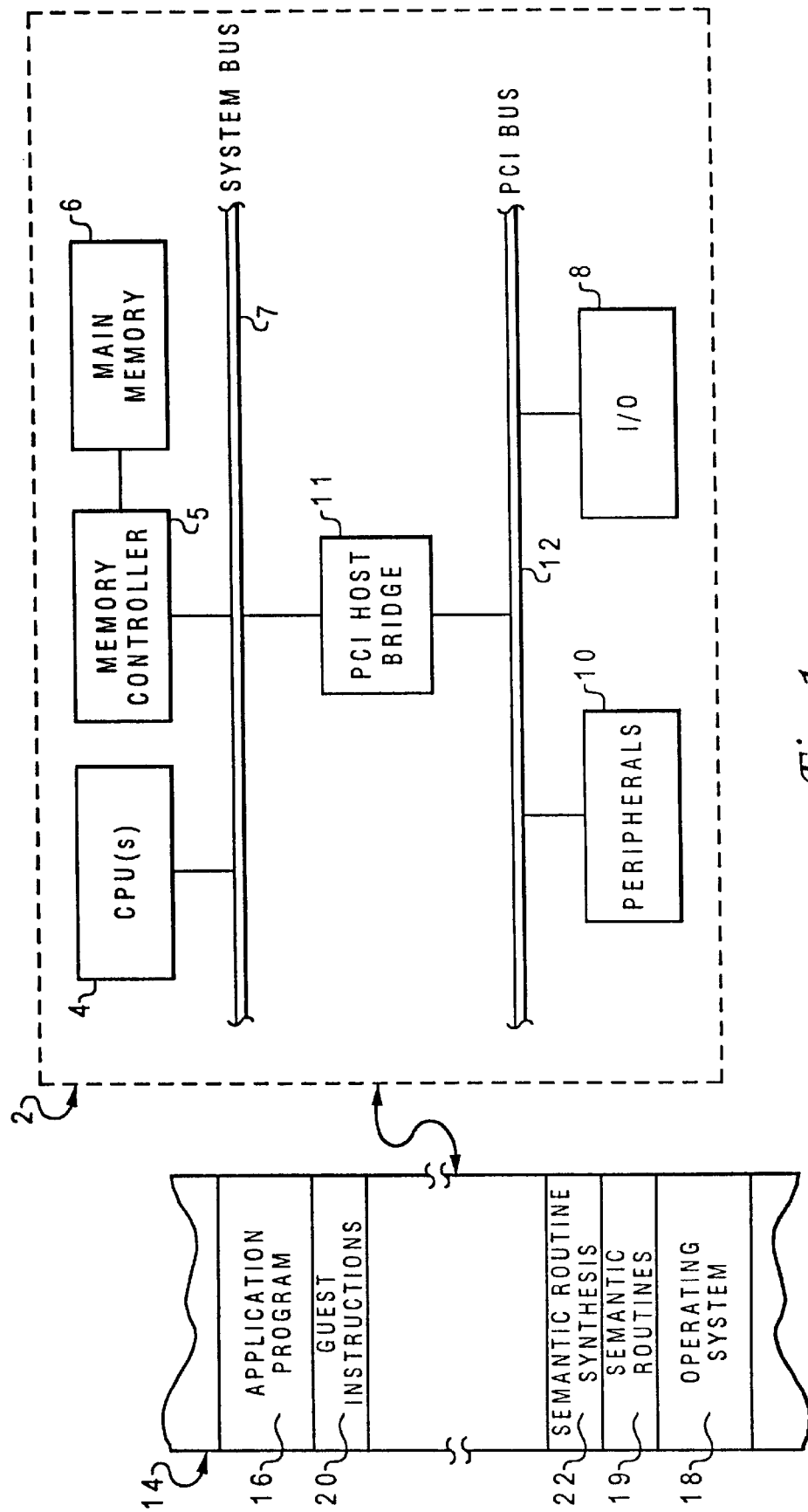
FIG. 1 depicts an illustrative embodiment of a data processing system with which the method and system of the present invention may advantageously be utilized.

With reference now to the figures and in particular with reference to FIG. 1, there is depicted a high level block diagram of a data processing system 2 in accordance with the present invention. As illustrated, data processing system 2, which can comprise a desktop computer system, includes one or more CPUs 4, which are connected to the other components of data processing system 2 in a standard hardware configuration. For example, CPUs 4 can be interconnected to main memory 6 via a memory controller 5 and system bus 7. System bus 7 is also coupled to PCI (Peripheral Component Interconnect) bus 12 by a PCI host bridge 11, which permits communication between the devices coupled to system bus 7 and peripherals 10 and I/O components 8. Although for the purpose of illustration, the present invention is described below with reference to an illustrative embodiment in which CPU 4 is implemented with one of the PowerPC™ line of processors manufactured by International Business Machines Corporation, it should be understood that a variety of other processors could alternatively be employed.

When implemented as a PowerPC™ processor, each CPU 4 preferably comprises a single integrated circuit superscalar microprocessor, including various registers, buffers, execution units, and functional units that operate according to reduced instruction set computing (RISC) techniques. Each CPU 4 executes RISC instructions within the PowerPC™ instruction set architecture (e.g., the instructions forming application program 16 and operating system/kernel 18) from a memory map 14. The PowerPC™ instruction set architecture native to CPU 4 is defined in a number of publications such as *PowerPC™ User Instruction Set Architecture* and *PowerPC™ 603 RISC Microprocessor User's Manual* (Order No. MPR603UMU-01), both available from IBM Microelectronics. RISC instructions, such as those defined by the PowerPC™ instruction set architecture, can be characterized as having a fixed instruction length (e.g., 32-bits), including only register-to-register and register-to-memory operations and not memory-to-memory operations, and being executed without microcoding, often in one machine cycle.

Each CPU 4 is further adapted in accordance with the present invention to execute guest instructions (e.g., CISC instructions or some other instruction set that is not native to CPU 4) by emulation. As described further hereinbelow, guest instructions 20 are each emulated by fetching and executing one or more semantic routines 19, which each contain two or more native instructions. For example, a guest instruction 20 might be a memory-to-memory CISC instruction such as:

ADD MEM1, MEM2, MEM3 meaning "add the contents of memory location #1 to the contents of memory location #2 and store the result in memory location #3." A semantic routine 19 to emulate this guest CISC instruction might contain the following native RISC instructions:

LOAD REG1, MEM1

LOAD REG2, MEM2

ADD REG3, REG2, REG1

STORE REG3, MEM3

This exemplary semantic routine 19 loads the contents of memory locations #1 and #2 into registers #1 and #2, respectively, adds the contents of registers #1 and #2, stores the result of the addition in register #3, and stores the contents of register #3 to memory location #3. As further illustrated in FIG. 1, memory map 14 preferably further includes semantic routine synthesis code 22, which comprises user-level code that can be utilized to synthesize a semantic routine corresponding to a guest instruction if such a semantic routine is not already one of the semantic routines in area 19.

Figure 2:
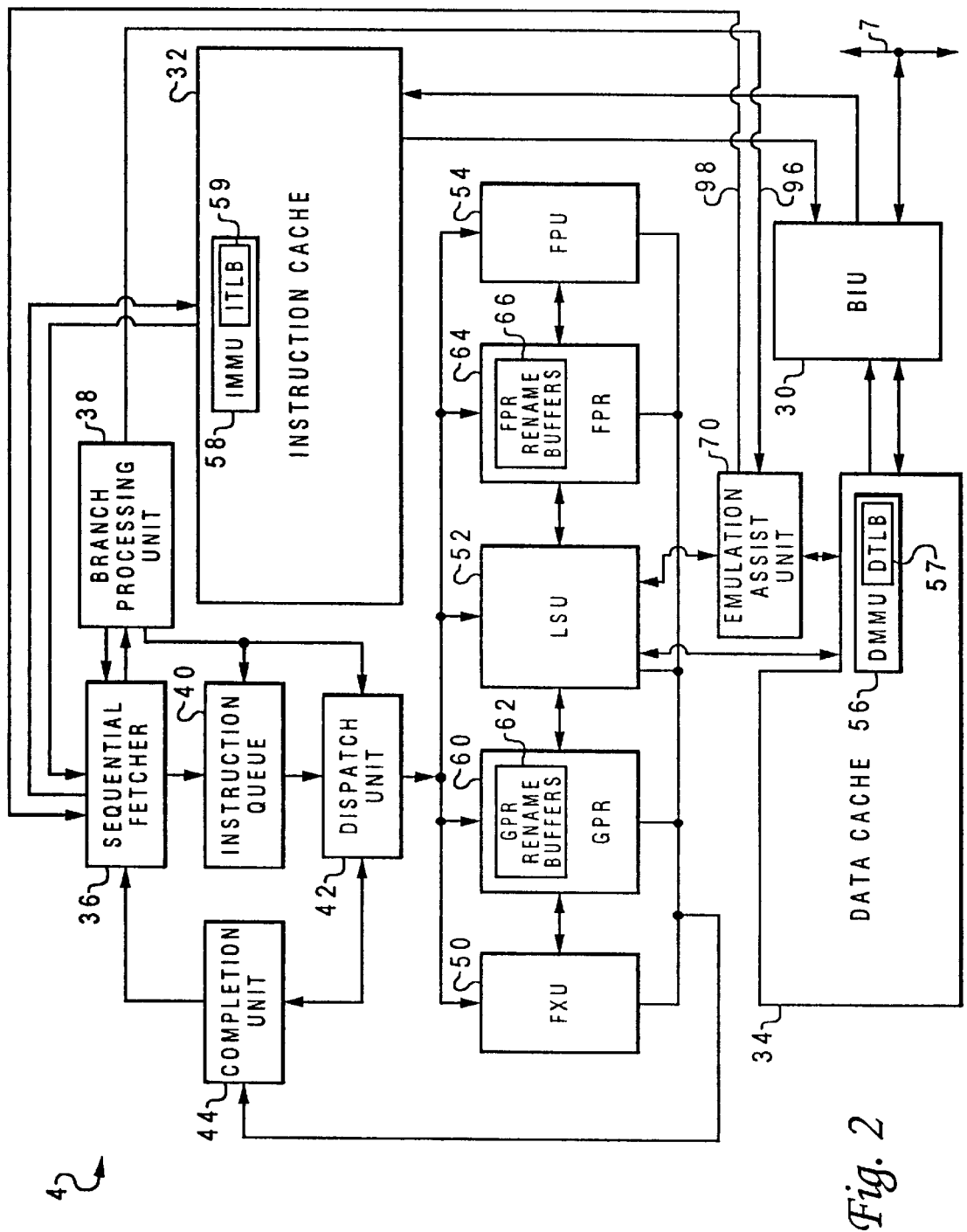
FIG. 2 illustrates a more detailed block diagram of the processor depicted in FIG. 1.

Referring now to FIG. 2, there is illustrated a more detailed block diagram of CPU 4. As depicted, CPU 4 is coupled to system bus 12 via a bus interface unit (BIU) 30 that controls the transfer of information between CPU 4 and other devices that are coupled to system bus 12. BIU 30 is also connected to instruction cache 32 and data cache 34. Both instruction cache 32 and data cache 34 are high-speed caches which enable CPU 4 to achieve a relatively fast access time to instructions and data previously transferred from main memory 6, thus improving the speed of operation of data processing system 2. Instruction cache 32 is further coupled to sequential fetcher 36, which fetches native instructions from instruction cache 32 during each execution cycle. Sequential fetcher 36 transmits branch instructions fetched from instruction cache 32 to branch processing unit (BPU) 38 for execution, but temporarily buffers sequential instructions within instruction queue 40. The sequential instructions stored within instruction queue 40 are subsequently dispatched by dispatch unit 42 to the sequential execution circuitry of CPU 4.

In the depicted illustrative embodiment, the sequential execution circuitry of CPU 4 includes three (or more) execution units, namely, fixed-point unit (FXU) 50, load/store unit (LSU) 52, and floating-point unit (FPU) 54. Each of these three execution units can execute one or more classes of native instructions, and all execution units can operate concurrently during each processor cycle. For example, FXU 50 performs fixed-point mathematical operations such as addition, subtraction, ANDing, ORing, and XORing, utilizing source operands received from specified general purpose registers (GPRs) 60 or GPR rename buffers 62. Following the execution of a fixed-point instruction, FXU 50 outputs the data results of the instruction to GPR rename buffers 62, which provide temporary storage for the data results until the data results are written to at least one of the GPRs 60 during the writeback stage of instruction processing. Similarly, FPU 54 performs floating-point operations, such as floating-point multiplication and division, on source operands received from floating-point registers (FPRs) 64 or FPR rename buffers 66. FPU 54 outputs data resulting from the execution of floating-point instructions to selected FPR rename buffers 66, which temporarily store the data results until the data results are written to selected FPRs 64 during the writeback stage of instruction processing. As its name implies, LSU 52 executes floating-point and fixed-point instructions which either load data from memory (i.e., either data cache 34 or main memory 6) into selected GPRs 60 or FPRs 64 or which store data from a selected one of GPRs 60, GPR rename buffers 62, FPRs 64, or FPR rename buffers 66 to data cache 34 or main memory 6.

CPU 4 employs both pipelining and out-of-order execution of instructions to further improve the performance of its superscalar architecture. Accordingly, multiple instructions can be simultaneously executed by BPU 38, FXU 50, LSU 52, and FPU 54 in any order as long as data dependencies and antidependencies are observed between sequential instructions. In addition, instructions are processed by each of FXU 50, LSU 52, and FPU 54 at a sequence of pipeline stages, including fetch, decode/dispatch, execute, finish and completion/writeback. Those skilled in the art should appreciate, however, that some pipeline stages can be reduced or combined in certain design implementations.

During the fetch stage, sequential fetcher 36 retrieves one or more native instructions associated with one or more memory addresses from instruction cache 32. As noted above, sequential instructions fetched from instruction cache 32 are stored by sequential fetcher 36 within instruction queue 40. In contrast, sequential fetcher 36 removes (folds out) branch instructions from the instruction stream and forwards them to BPU 38 for execution. BPU 38 preferably includes a branch prediction mechanism, which in an illustrative embodiment comprises a dynamic prediction mechanism such as a branch history table, that enables BPU 38 to speculatively execute unresolved conditional branch instructions by predicting whether or not the branch will be taken.

During the decode/dispatch stage, dispatch unit 42 decodes and dispatches one or more native instructions from instruction queue 40 to an appropriate one of sequential execution unit 50, 52, and 54 as dispatch-dependent execution resources become available. These execution resources, which are allocated by dispatch unit 42, include a rename buffer within GPR rename buffers 60 or FPR rename buffers 66 for the data result of each dispatched instruction and an entry in the completion buffer of completion unit 44.

During the execute stage, execution units 50, 52, and 54 execute native instructions received from dispatch unit 42 opportunistically as operands and execution resources for the indicated operations become available. In order to minimize dispatch stalls, each one of the execution units 50, 52, and 54 is preferably equipped with a reservation table that stores dispatched instructions for which operands or execution resources are unavailable.

After the operation indicated by a native instruction has been performed, the data results of the operation are stored by execution units 50, 52, and 54 within either GPR rename buffers 62 or FPR rename buffers 66, depending upon the instruction type. Then, execution units 50, 52, and 54 signal completion unit 44 that the execution unit has finished an instruction. In response to receipt of a finish signal, completion unit 44 marks the completion buffer entry of the instruction specified by the finish signal as complete. Instructions marked as complete thereafter enter the writeback stage, in which instructions results are written to the architected state by transferring the data results from GPR rename buffers 62 to GPRs 60 or FPR rename buffers 66 to FPRs 64, respectively. In order to support precise exception handling, native instructions are written back in program order.

Figure 3:
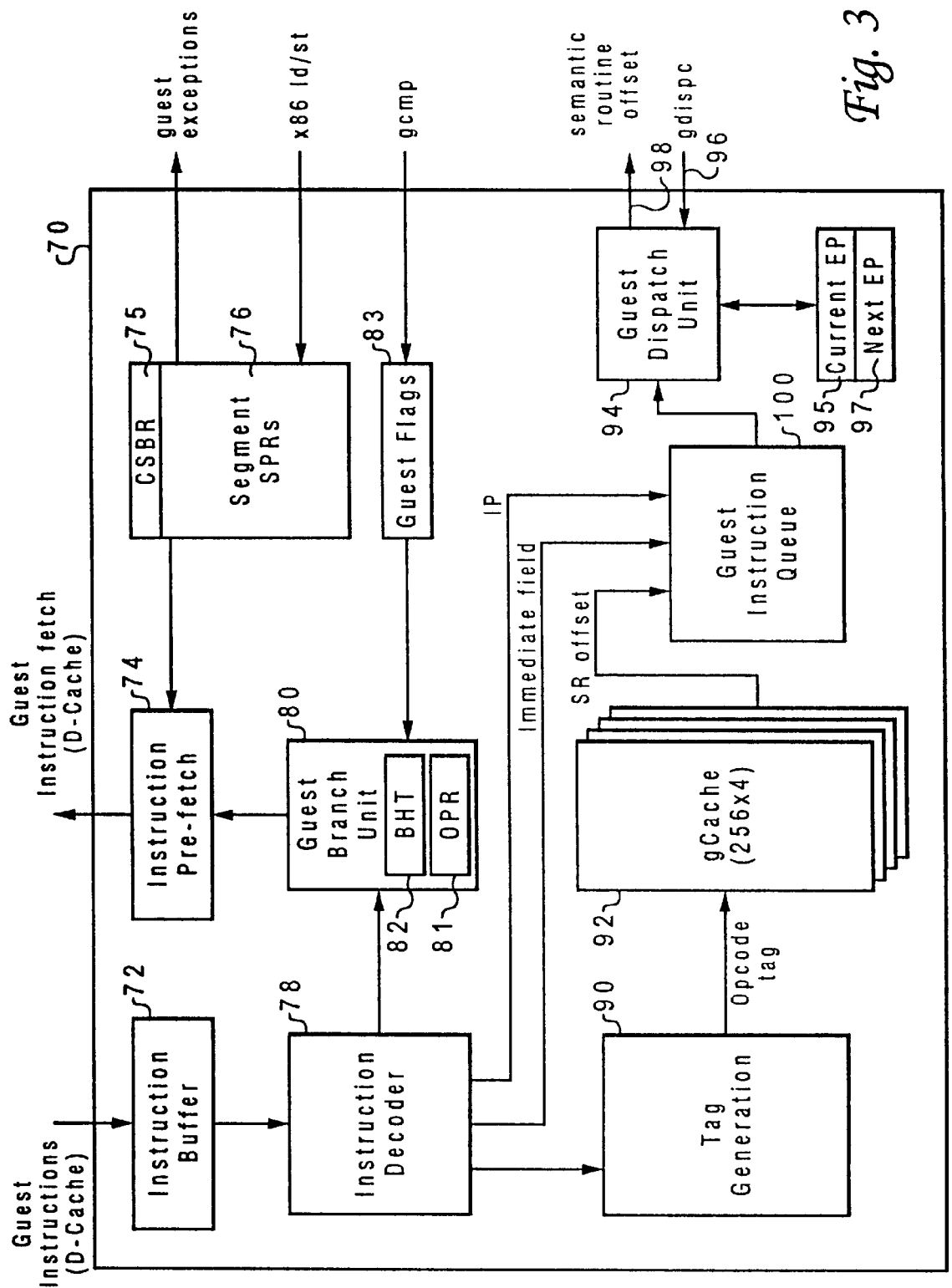
FIG. 3 depicts a more detailed block diagram of the emulation assist unit (EAU) in the processor of FIG. 2.

As illustrated in FIG. 2, in order to facilitate the emulation of guest instructions, CPU 4 includes emulation assist unit (EAU) 70, which is shown in greater detail in FIG. 3. As illustrated in FIG. 3, EAU 70 includes a number of special purpose registers (SPRs) 76 for storing, among other things, the logical base address of segments of guest address space containing guest instructions. SPRs 76 include a code segment base register (CSBR) 75 that stores the base address of the current segment and an offset to the current guest instruction. EAU 70 further includes an instruction prefetch unit 74 for fetching guest instructions from data cache 34 and an instruction buffer 72 for temporarily storing guest instructions retrieved from data cache 34. In addition, EAU 70 includes an instruction decoder 78 for decoding guest instructions, a guest branch unit 80 for executing guest branch instructions, tag generation unit 90, which generates opcode tags for each sequential guest instruction, guest cache 92, which stores a semantic routine (SR) offset in association with each of a plurality of opcode tags, a guest instruction queue 100 for storing information associated with guest instructions, and a guest dispatch unit 94 that provides SR addresses to sequential fetcher 36.

Figure 4:
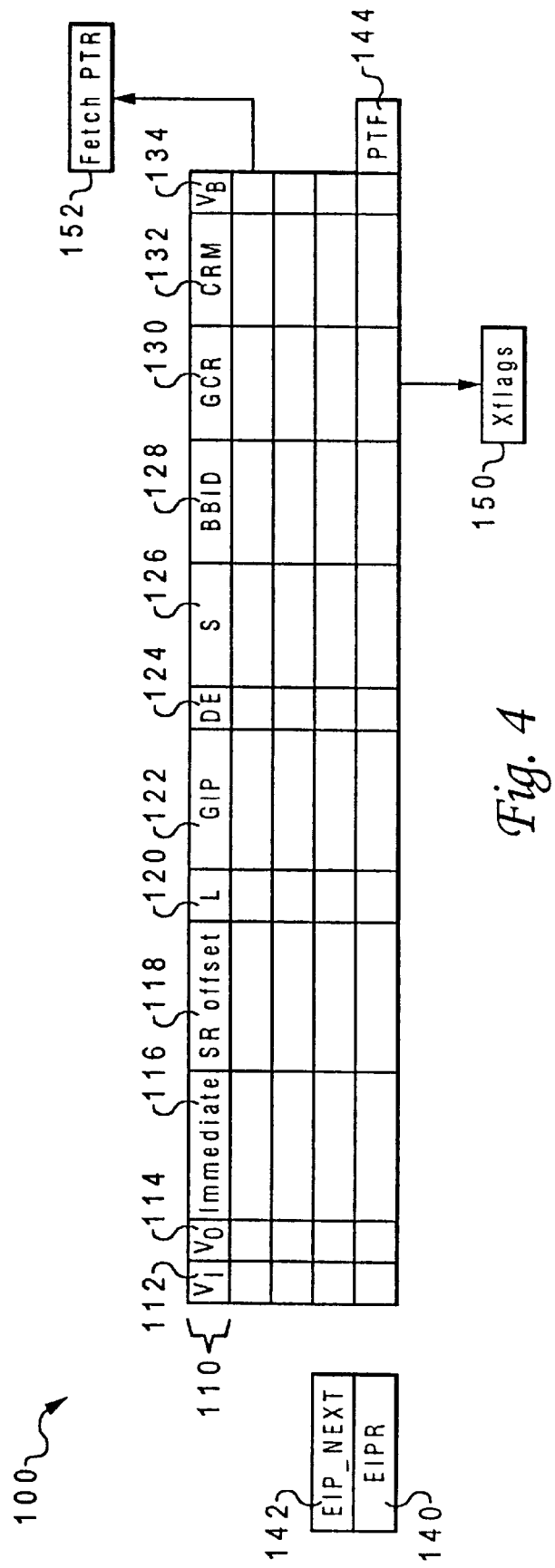
FIG. 4 illustrates a more detailed block diagram of the guest instruction queue within the EAU depicted in FIG. 3.

Referring now to FIG. 4, there is illustrated a more detailed view of guest instruction queue 100, which provides a synchronization point between the guest instruction stream and native instruction stream. As will become apparent from the following description, the provision of guest instruction queue 100 permits guest instructions emulated by CPU 4 to be pre-processed so that the latency associated with the various emulation pipeline stages can be overlapped.

In the illustrative embodiment, guest instruction queue 100 contains five entries 110, which each include the following fields 112–134:

$V_I$: indicates whether the content of immediate field 116 is valid $V_O$: indicates whether the content of SR offset field 118 is valid Immediate: stores immediate data that is specified by the guest instruction and is passed as a parameter to the corresponding semantic routine SR offset: offset between the base address of the guest instruction (which is maintained in CSBR 75) and the corresponding semantic routine L: length of semantic routine in native instructions GIP: offset pointer from CSBR 75 to guest instruction in guest address space DE: indicates whether two guest instruction queue entries (and two semantic routines) are utilized in the emulation of a single guest instruction S: indicates whether the guest instruction is in a speculative (i.e., predicted) execution path in the guest instruction stream BBID: unique basic block ID number sequentially assigned to each semantic routine from pool of BBIDs GCR: guest condition register that indicates conditions (e.g., equal/not equal) that may be utilized to predict subsequent guest branch instructions CRM: guest condition register mask that indicates which bits in the GCR field will be altered by the guest instruction $V_B$: indicates whether the semantic routine native instruction that will set the value of GCR field 130 has executed As depicted in FIG. 4, guest instruction queue 100 has an associated emulation instruction pointer register (EIPR) 140, preferably implemented as a software-accessible special purpose register (SPR), which contains the offset from the base address specified by CSBR 75 to the current guest instruction that is being interpreted. EAU 70 updates the contents of EIPR 140 in response to the execution of a newly-defined "guest dispatch completion" (gdispc) instruction in the native instruction set and in response to the execution of a guest branch instruction by guest branch unit 80 without invoking a semantic routine. Another special purpose register, emulation instruction pointer next (EIP_NEXT) register 142, contains the offset from the base address specified in CSBR 75 to the next guest instruction that will be interpreted. EAU 70 updates the contents of EIP_NEXT register 142 when a gdispc instruction is executed, when a special move to SPR instruction (i.e., mtspr[EIP_NEXT]) is executed having EIP_NEXT register 142 as a target, and when a guest branch or guest NOOP instruction is emulated without invoking a semantic routine. These two offset pointers permit the state of the guest instruction stream to be easily restored following a context switch, for example, when returning from an exception. That is, by saving both the current EIP and the next EIP, the guest instruction under emulation at the time of the interrupt, which is pointed to by the current EIP, does not need to be reexecuted to compute the next EIP if both the current EIP and next EIP are saved.

Guest instruction queue 100 also has an associated predicted taken flag (PTF) 144, which indicates whether an unresolved guest branch instruction was predicted as taken and therefore whether sequential guest instructions marked as speculative (i.e., S field 126 is set) are within the target or sequential execution path.

Xflags 150 is an architected condition register for which GCR 130 in each of entries 110 is a "renamed" version. When an entry 110 is removed from the bottom of guest instruction queue 100, the bits within Xflags 150 specified by CRM 132 in that entry 110 are updated by the corresponding bit values in GCR 130. Xflags 150, GCR fields 130, CRM fields 132, and $V_B$ fields 134 (and the associated access circuitry), which are identified in FIG. 3 simply as guest flags 83, can be referenced by guest branch unit 80 to resolve guest branch instructions as described further herein below.

In cases in which each guest instruction is emulated by executing a single semantic routine, each guest instruction is allocated only a single entry 110 within guest instruction queue 100. However, in some circumstances more than one entry 110 may be allocated to a single sequential guest instruction. For example, in an embodiment in which the guest instructions are x86 instructions, many sequential guest instruction comprise two distinct portions: a first portion that specifies how the addresses of the source(s) and destination of the data are determined and a second portion that specifies the operation to be performed on the data. In such cases, a first semantic routine is utilized to emulate the portion of instruction execution related to the determination of the data source and destination addresses and a second semantic routine is utilized to emulate the portion of instruction execution related to performing an operation on the data. Accordingly, the guest instruction is allocated two entries 110 in guest instruction queue 100—a first entry containing information relevant to the first semantic routine and a second entry containing information relevant to the second semantic routine. Such dual entry guest instructions are indicated within guest instruction queue 100 by setting DE (dual entry) field 124 in the older (first) of the two entries 110. Setting the DE field ensures that both entries 110 will be retired from guest instruction queue 100 when both semantic routines have completed (i.e., in response to a gdispc instruction terminating the second semantic routine). The emulation of guest instructions utilizing two semantic routines advantageously permits some semantic routines to be shared by multiple guest instructions, thereby reducing the overall memory footprint of semantic routines 19.

The ordering of the entries 110 in guest instruction queue 100 is maintained by current entry pointer 95, which points to the oldest entry in guest instruction queue 100, and next entry pointer 97, which points to the next oldest entry. In response to a fetch or completion of a gdispc instruction, the guest instruction queue entry indicated by current entry pointer 95 is retired and both current entry pointer 95 and next entry pointer 97 are updated. Thus, entries are consumed from the "bottom" and inserted at the "top" of guest instruction queue 100.

With reference now to FIGS. 2–4, the operation of EAU 70 will now be described.

EAU INITIALIZATION

To initialize EAU 70 for emulation, the address offset to the first guest instruction to be emulated is loaded into EIP_NEXT register 142 by executing a native move to SPR (mtspr) instruction having EIP_NEXT register 142 as a target (i.e., mtspr[EIP_NEXT] in the PowerPC™ instruction set). In a preferred embodiment, this native instruction is equivalent to a guest branch always instruction since the function of such a guest branch instruction would be to load EIP_NEXT register 142 with a pointer to the next guest instruction to be executed (i.e., the offset value within CSBR 75). $V_I$ field 112 and $V_O$ field 114 of the oldest entry 110 in guest instruction queue 100 are both cleared in response to the mtspr[EIP_NEXT] instruction. Thereafter, prefetching of guest instruction from data cache 34 can be triggered utilizing a gdispc instruction.

As an aside, $V_I$ field 112 and $V_O$ field 114 of the oldest entry 110 in guest instruction queue 100 are also cleared in response to mtspr[EIP] and mtspr[CSBR] instructions, as well as when a guest branch instruction is resolved as mispredicted.

GUEST INSTRUCTION PREFETCHING

As noted above, prefetching of guest instructions from data cache 34 is triggered by placing a gdispc instruction in the native instruction stream. When fetched by sequential fetcher 36, the gdispc instruction acts as an interlock that stalls fetching by sequential fetcher 36 until $V_O$ field 114 of the oldest entry 110 in guest instruction queue 100 is set. In response to the stall of sequential fetcher 36, instruction prefetch unit 74 in EAU 70 makes a fetch request to data cache 34 for the guest instruction at the address specified by the base address and offset contained in CSBR 75.

GUEST INSTRUCTION DECODING

Guest instructions supplied by data cache 34 in response to fetch requests from instruction prefetch unit 74 are temporarily stored in instruction buffer 72 and then loaded one at a time into instruction decoder 78, which at least partially decodes each guest instruction to determine the instruction length, whether the guest instruction is a branch instruction, and the immediate data of the guest instruction, if any.

GUEST BRANCH INSTRUCTION PROCESSING

If instruction decoder 78 determines that a guest instruction is a branch instruction, the guest branch instruction is forwarded to guest branch unit 80 for processing after allocating the guest branch instruction the oldest unused entry 110 of guest instruction queue 100. (In an alternative embodiment, guest instruction ordering can be maintained without assigning guest instruction queue entries to guest branch instructions). Guest branch unit 80 first attempts to resolve a conditional guest branch instruction with reference to guest flags 83. If the bit(s) upon which the guest branch depends are set within CRM field 132 and $V_B$ field 134 is marked valid in the entry 110 corresponding to the immediately preceding sequential guest instruction, guest branch unit 80 resolves the guest branch instruction by reference to GCR field 130 of the entry 110 of immediately preceding sequential guest instruction. If, however, the relevant bit(s) within CRM 132 in the entry 110 corresponding to the immediately preceding sequential guest instruction are not set, the guest branch instruction is resolved by reference to the newest preceding entry 110, if any, having the relevant bits set in CRM field 132 and $V_B$ field 134 marked as valid, or failing that, by reference to Xflags 150. On the other hand, guest branch unit 80 predicts (i.e., speculatively executes) a conditional guest branch instruction by reference to conventional branch history table (BHT) 82 if $V_B$ field 134 is marked invalid in the newest preceding entry 110 in which the bit(s) relevant to the guest branch are set in GCR field 130. The guest instruction at the address of the resolved or predicted execution path is thereafter fetched from data cache 34 via instruction prefetch unit 74. Further details about the processing of guest branch instructions are found in Ser. No. 08/934,644 now U.S. Pat. No. 5,870,575 and Ser. No. 08/934,857, which were referenced hereinabove.

SEQUENTIAL GUEST INSTRUCTION PROCESSING

If the guest instruction decoded by instruction decoder 78 is a sequential instruction, at least the oldest unused entry 110 of guest instruction queue 100 is allocated to the guest instruction. As illustrated in FIG. 3, instruction decoder 78 then stores the immediate data, if any, and the offset pointer to the guest instruction into immediate field 116 and GIP field 122, respectively, of the allocated entry 110. In response to instruction decoder 78 loading immediate data into immediate field 116, $V_I$ field 112 is set.

The sequential guest instruction is then forwarded from instruction decoder 78 to tag generation unit 90, which converts the guest instruction into a unique opcode tag. According to a preferred embodiment, different opcode tags are utilized not only to distinguish between different guest instructions, but also to distinguish between identical guest instructions that access different registers. Thus, different opcode tags are utilized for guest divide (gdiv) and guest multiply (gmult) instructions, as well for gmult R3,R2,R1 and gmult R4,R2,R1 instructions, which target different registers. The unique opcode tag produced by tag generation unit 90 forms an index into guest cache 92 that selects a particular cache entry containing an offset utilized to determine the effective address of the semantic routine corresponding to the guest instruction.

As indicated, in the illustrative embodiment, guest cache 92 comprises a four-way set associative cache having 256 lines that each contain four 4 Kbyte entries. A miss in guest cache 92 generates a user-level interrupt, which is serviced by executing semantic routine synthesis code 22. As described above, semantic routine synthesis code 22 synthesizes a semantic routine corresponding to the guest instruction from native instructions and stores the semantic routine in area 19 of memory map 14. The offset from the base address of the guest instruction to the location of the newly synthesized semantic routine is then stored in guest cache 92 for subsequent recall. Because guest instruction sets are typically fairly stable, it is typical for guest cache 92 to achieve hit rates above 99%.

In response to the semantic routine (SR) offset being located (or stored) in guest cache 92, the SR offset is stored in SR offset field 118 of the allocated entry 110, thereby causing $V_O$ field 114 to be marked as valid. By the time $V_O$ is set to signify that the content of SR offset field 118 is valid, L field 120, DE field 124, S field 126, BBID field 128, and CRM field 132 are also valid within the allocated entry 110. As noted above, GCR field 130 is indicated as valid separately by $V_B$ field 134.

When $V_O$ field 114 of the oldest entry 110 in guest instruction queue 100 is set by the processing of the first guest instruction in EAU 70 at emulation startup, the value in EIP_NEXT register 142 is transferred to EIPR 140, signifying that the oldest (i.e., first) instruction in guest instruction queue 100 is the guest instruction currently being processed. In response to this event, guest dispatch unit 94 transmits the SR offset in SR offset field 118 to sequential fetcher 36, which begins to fetch native instructions within the semantic routine corresponding to the first guest instruction. As illustrated in FIG. 4, EAU 70 tracks the guest instruction for which the semantic routine is being fetched utilizing fetch PTR 152 in guest dispatch unit 94.

SEMANTIC ROUTINE PROCESSING

Semantic routine (i.e., native) instructions that are within the standard instruction set of CPU 4 are processed by CPU 4 as described above with reference to FIG. 2. Special instructions inserted into the native instruction set to support guest instruction emulation are handled as described below.

In order to connect guest instructions into a continuous guest instruction stream, a gdispc instruction is preferably inserted at the end of each semantic routine, if the guest instructions are each represented by a single semantic routine, or at the end of the last semantic routine corresponding to the guest instruction, if the guest instruction is emulated by multiple semantic routines. The gdispc instruction is preferably defined as a special form of a native branch instruction so that when fetched from instruction cache 32 by sequential fetcher 36 a gdispc instruction is folded out of the native instruction stream and passed to BPU 38. In response to detecting the gdispc instruction, BPU 38 asserts signal line 96. Guest dispatch unit 94 responds to the assertion of signal line 96 by removing all of the entries 110 corresponding to the current guest instruction from guest instruction queue 100 and by passing the semantic routine offset stored within the next entry to sequential fetcher 36 via signal lines 98. As described above, sequential fetcher 36 then computes the effective address (EA) of the semantic routine corresponding to the next guest instruction by adding the semantic routine offset to the guest instruction's base address and fetches the semantic routine from memory for execution by CPU 4.

When multiple semantic routines are utilized to emulate a single guest instruction, semantic routines other than the final semantic routine are terminated by a "guest dispatch prolog completion" (gdispp) instruction, which is a variant of the gdispc instruction. In general, the gdispp instruction is processed like the gdispc instruction. For example, like the gdispc instruction, the gdispp instruction triggers the fetching of the next semantic routine. In addition, $V_O$ field 114 within the guest instruction queue entry 110 corresponding to the semantic routine containing a gdispp instruction must be set in order for the gdispp instruction to be executed. However, in contrast to the processing of a gdispc instruction, the completion of a gdispp instruction does not trigger the removal of an entry 110 from guest instruction queue 100 or the updating of EIPR 140 and EIP_NEXT register 142.

Another special instruction inserted into the native instruction set as a form of add instruction is the guest add immediate prolog [word or half word] (gaddpi[w,h]) instruction. The function of the gaddpi[w,h] instruction is to add the immediate data specified in the first of two guest instruction queue entries allocated to a guest instruction with the value in a specified GPR 60 and store the sum in another GPR 60. Accordingly, $V_I$ field 112 for the first entry 110 must be set in order to permit the corresponding semantic routine to execute.

A similar guest add immediate completion [word or half word] (gaddci[w,h]) instruction is utilized to add the immediate data stored in the second of two guest instruction queue entries allocated to a guest instruction with value of a specified GPR 60 and store the sum in another GPR 60. $V_I$ field 112 for the second entry 110 must be set in order for the corresponding semantic routine to execute.

INTERRUPT AND EXCEPTION HANDLING

In response to either a guest instruction or native instruction exception, a non-architected exception flag is set that disables guest instruction fetching by instruction prefetch unit 74. At a minimum, the context of the guest instruction stream is saved during interrupt/exception handling and restored upon returning from the interrupt/exception by saving the contents of EIPR 140 and EIP_NEXT register 142 in SPRs 76. As a practical matter, it is preferable to save the entire bottom entry 110 of guest instruction queue 100 in SPRs 76 in order to expedite the restart of emulation following the interrupt/exception.

Prefetching of guest instructions from data cache 34 following a return from interrupt can be triggered by the execution of either a gaddpi[w,h] instruction or gaddci[w,h] instruction, which interlocks with and stalls sequential fetcher 36 until $V_I$ field 112 of the appropriate entry 110 in guest instruction queue 100 is set. Guest instruction prefetching may also be restarted through the execution of a gdispc instruction or gdispp instruction. The execution of a gdisp[p,c] or gadd[p,c]i[w,h] instruction clears the exception flag.

MEMORY MANAGEMENT

Referring again to FIG. 2, instruction cache 32 (and main memory 6) is accessed via an instruction memory management unit (IMMU) 58, and likewise data cache 34 (and main memory 6) is accessed via a data memory management unit (DMMU) 56. Each of memory management units 56 and 58 has its own respective translation lookaside buffer, so there is an ITLB 59 and a separate DTLB 57. TLBs 57 and 59 each contain copies of page table entries from the page tables in memory 6, which correlate real (physical) addresses of pages in memory with logical (effective) addresses generated by CPU 4 for instructions and data. Since the memory management scheme for the guest (e.g., Intel x86) instruction architecture may differ significantly from the native PowerPC™ scheme, memory management units (MMUs) 56 and 58 include address translation facilities for guest instructions that reference memory.

Figure 5:
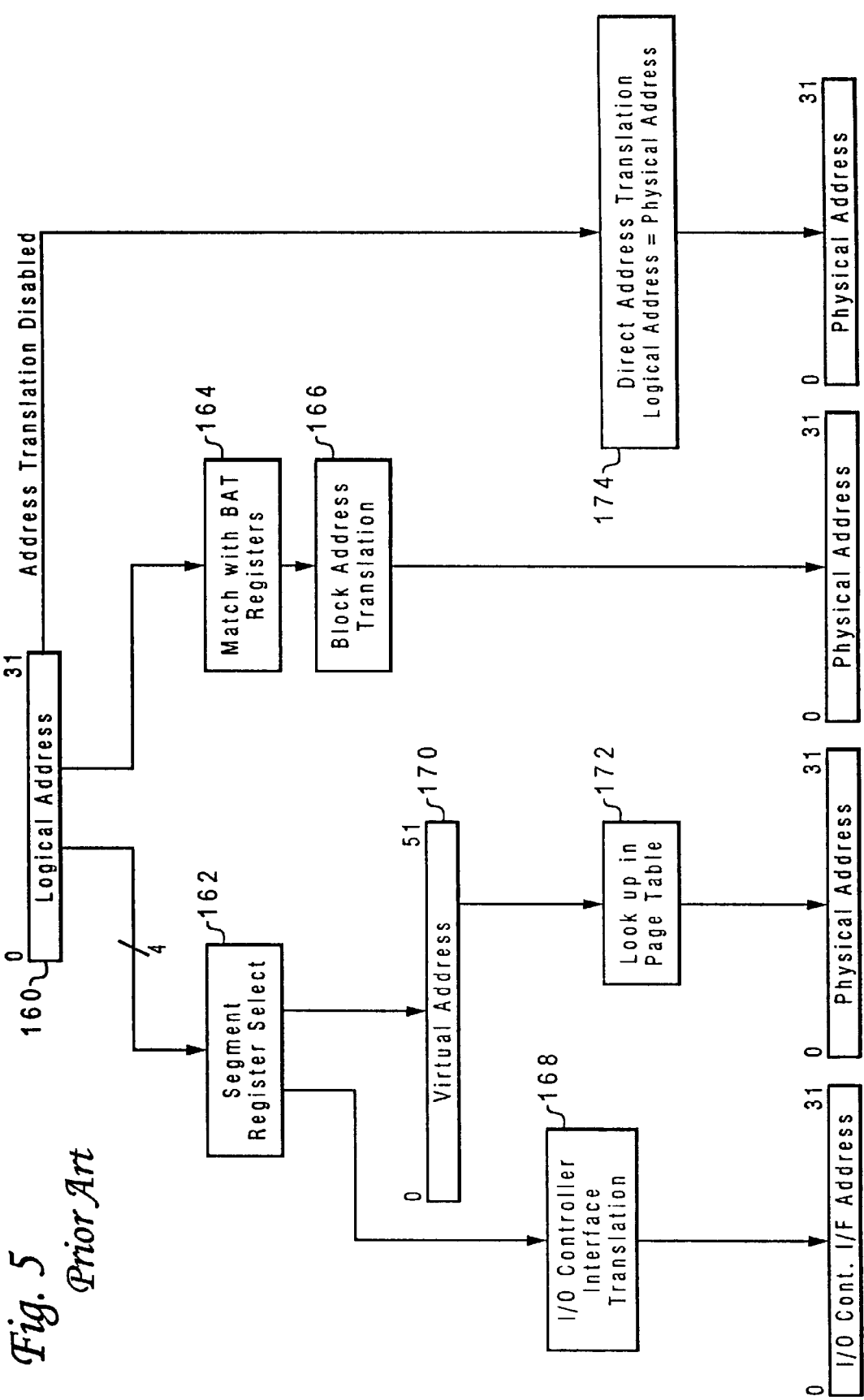
FIG. 5 is a diagram of a memory management scheme for CPU 4 utilized in the illustrative embodiment of FIG. 2.

Referring now to FIG. 5, there is depicted a diagram of the scheme utilized by MMUs 56 and 58 to translate logical (effective) addresses into physical addresses while processing native instructions. As illustrated, in response to receipt of a 32-bit logical (effective) address 60 by one of MMUs 56 and 58, a determination is made whether address translation is enabled. If not, the logical address is utilized as the physical address, as indicated at reference numeral 174. If, however, address translation is enabled, the MMU utilizes 4 high order bits from the logical address to select a segment register that contains a 24-bit segment address, as depicted at reference numeral 162. In parallel with the selection of the segment register, the logical address is compared with the address ranges defined in a Block Address Translation (BAT) array as illustrated at reference numeral 164. If the logical address falls with an address range defined in the BAT array, then block address translation is performed to obtain a 32-bit physical address as indicated at reference numeral 166.

However, if no match is found for the logical address in the BAT array, a control bit in the descriptor of the selected segment is tested to determine if the access is to memory or to I/O controller interface space. If the bit in the segment descriptor indicates that the access is to I/O controller interface space, I/O controller interface translation is performed to obtain a 32-bit I/O controller interface address, as shown at reference numeral 168. Otherwise, page address translation is performed by concatenating the 24-bit segment address with the low order 28 bits of the logical address to produce a 52-bit virtual address 170, and by thereafter translating this 52-bit virtual address into a 32-bit physical address, if possible, by reference to a page table entry (as indicated at reference numeral 172). If the required page table entry (PTE) is present in the relevant one of DTLB 57 and ITLB 59, the physical address corresponding to the logical address is immediately available. However, if a TLB miss occurs, an exception is taken, and the page table in memory is searched for the matching PTE.

Regardless of whether page address translation, block address translation, or direct address translation is performed, the resulting 32-bit physical address can then be utilized to access one of instruction cache 32 and data cache 34, and if a cache miss occurs, main memory 6.

Figure 6:
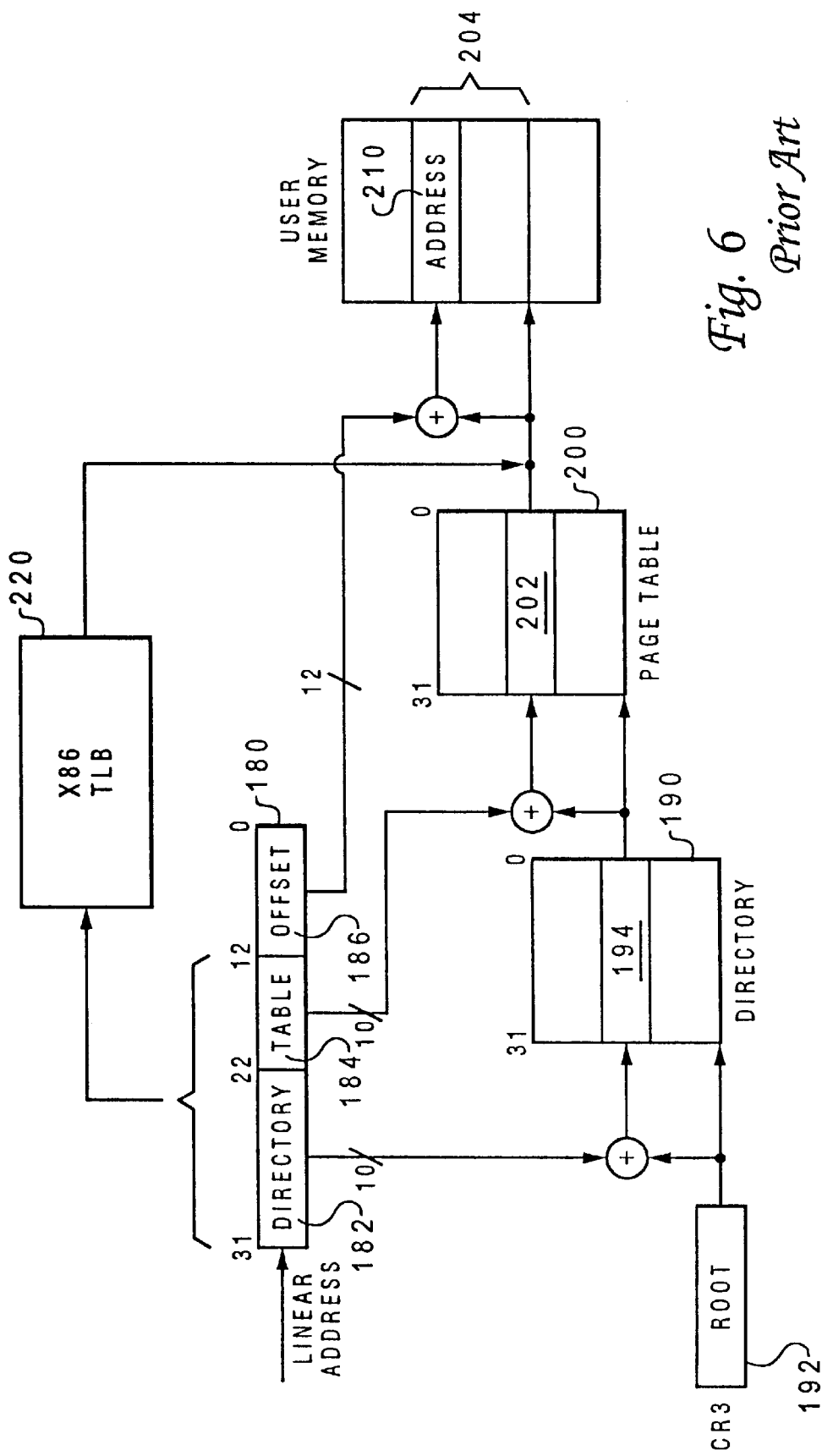
FIG. 6 is a diagram of a memory management scheme for the guest instructions used in the embodiment of FIG. 1–3.

With reference now to FIG. 6, the conventional two-level address translation scheme of the Intel x86 architecture is illustrated in diagram form. As depicted, a 32-bit linear address 180 is translated into a physical address by first partitioning linear address 180 into a 10-bit directory field 182, a 10-bit table field 184, and a 12-bit offset field 186. The value of directory field 182 is utilized as an offset that, when added to a root address stored in control register 192, accesses an entry 194 in page directory 190. Page directory entry 194 contains a pointer that identifies the base address of page table 200. The value of table field 184 forms an offset pointer that, when added to the value of directory entry 194, selects a page table entry 202 that specifies the base address of a page 204 in memory. The value of offset field 186 then specifies a particular physical address 210 within page 204.

As depicted in FIG. 6, the 20 high order bits of linear address 180 are also utilized in parallel to search for a matching page table entry in x86 TLB 220. If a match is found in x86 TLB 220, the matching page table entry is utilized to perform linear-to-real address translation in lieu of page directory 190 and page table 200, which require memory accesses.

By comparison of FIGS. 5 and 6, it should be apparent that guest instructions require a different page address translation scheme than native instructions. Accordingly, referring now to FIG. 7, a high level diagram of the method employed by the present invention to translate guest linear addresses into native real (physical) addresses is shown. According to the present invention, each guest linear address 240, which may be the target address of a guest instruction fetch, guest data load, or guest data store, is first translated into a guest real address 242 using the logical equivalent of the address translation scheme depicted in FIG. 6. A simple mapping translation, such as adding a fixed offset (which may be zero), is then performed to obtain native effective address 244. Subsequently, a native physical (real) address 246 is calculated using the logical equivalent of the process illustrated in FIG. 5.

Figure 7:
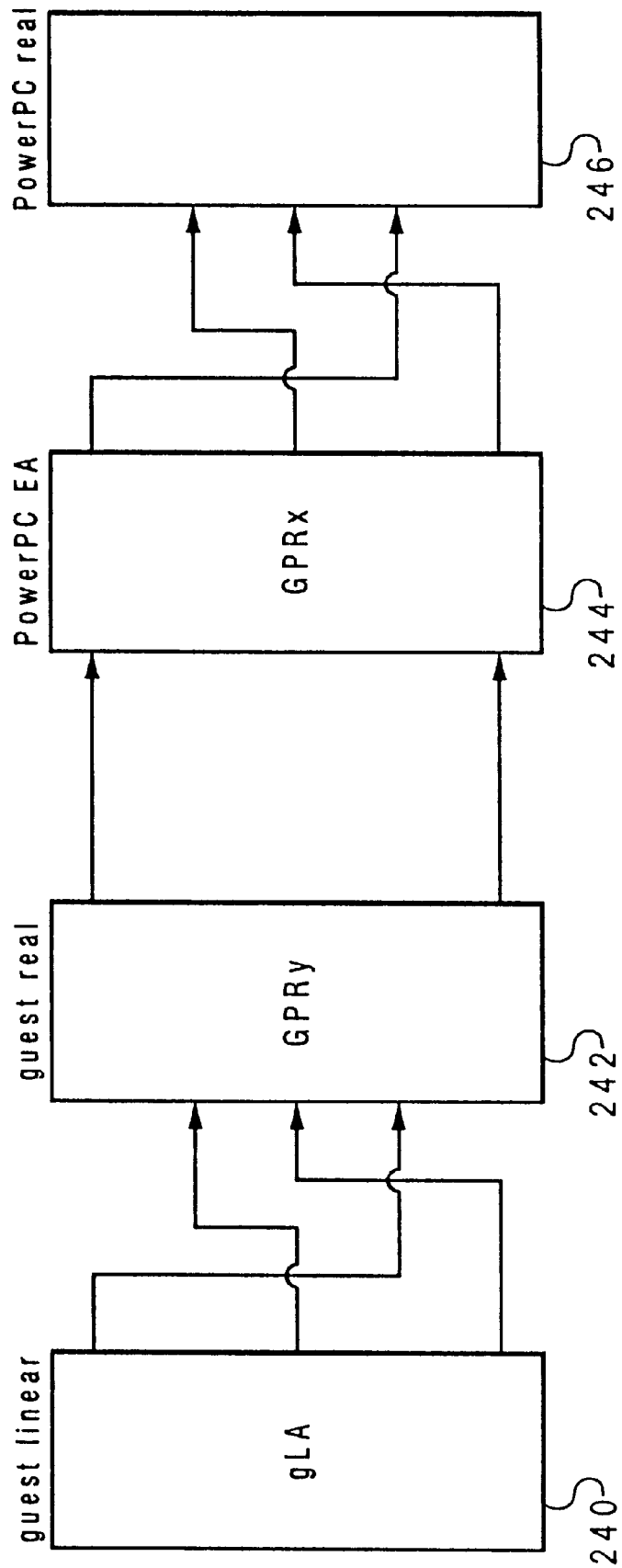
FIG. 7 is a diagram of an address translation scheme for guest instructions in the embodiment of FIGS. 1–6.
Figure 8:
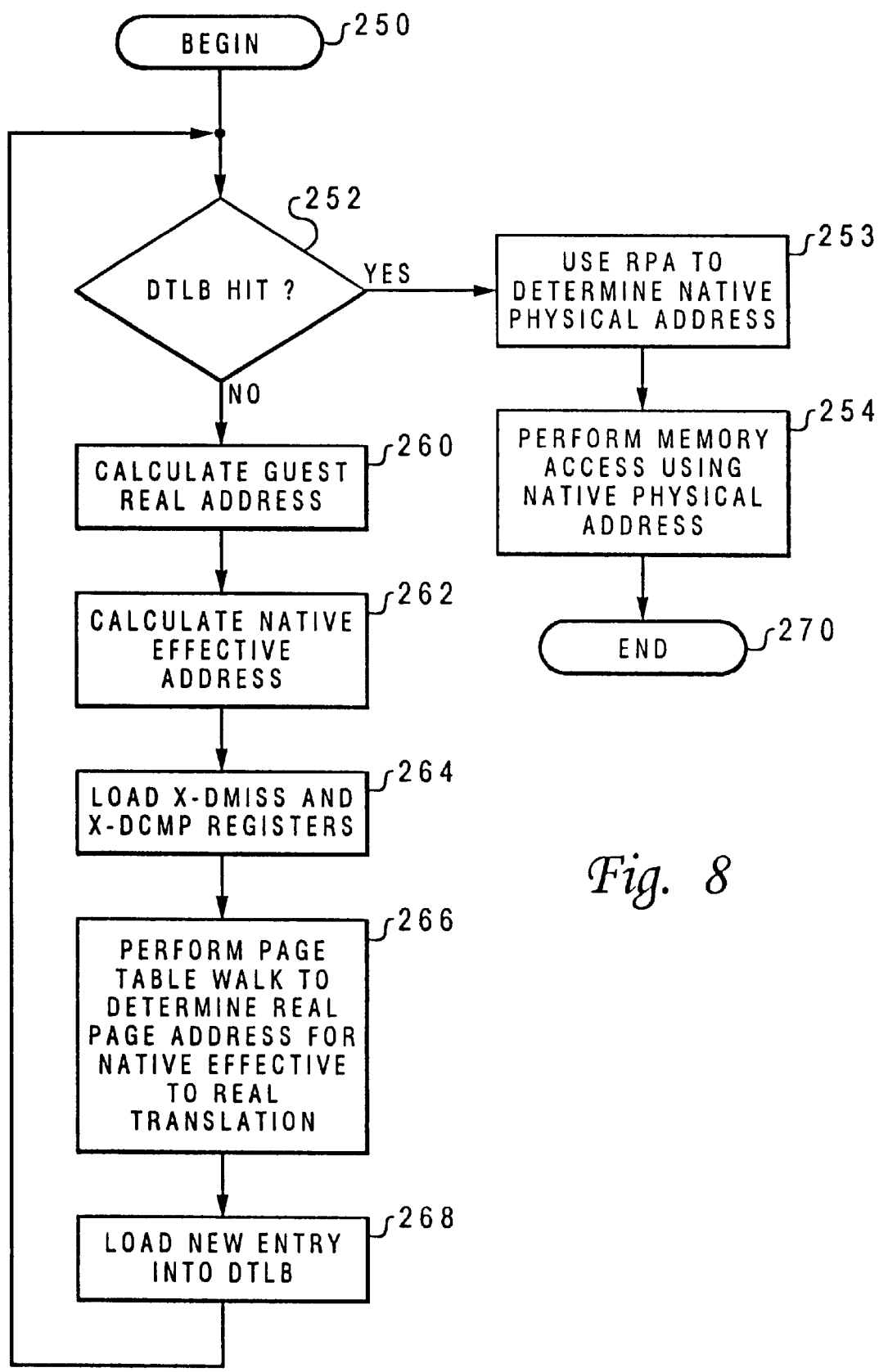
FIG. 8 is a high level logical flowchart of a method for generating a guest TLB entry in accordance with the illustrative embodiment.
Figure 9:
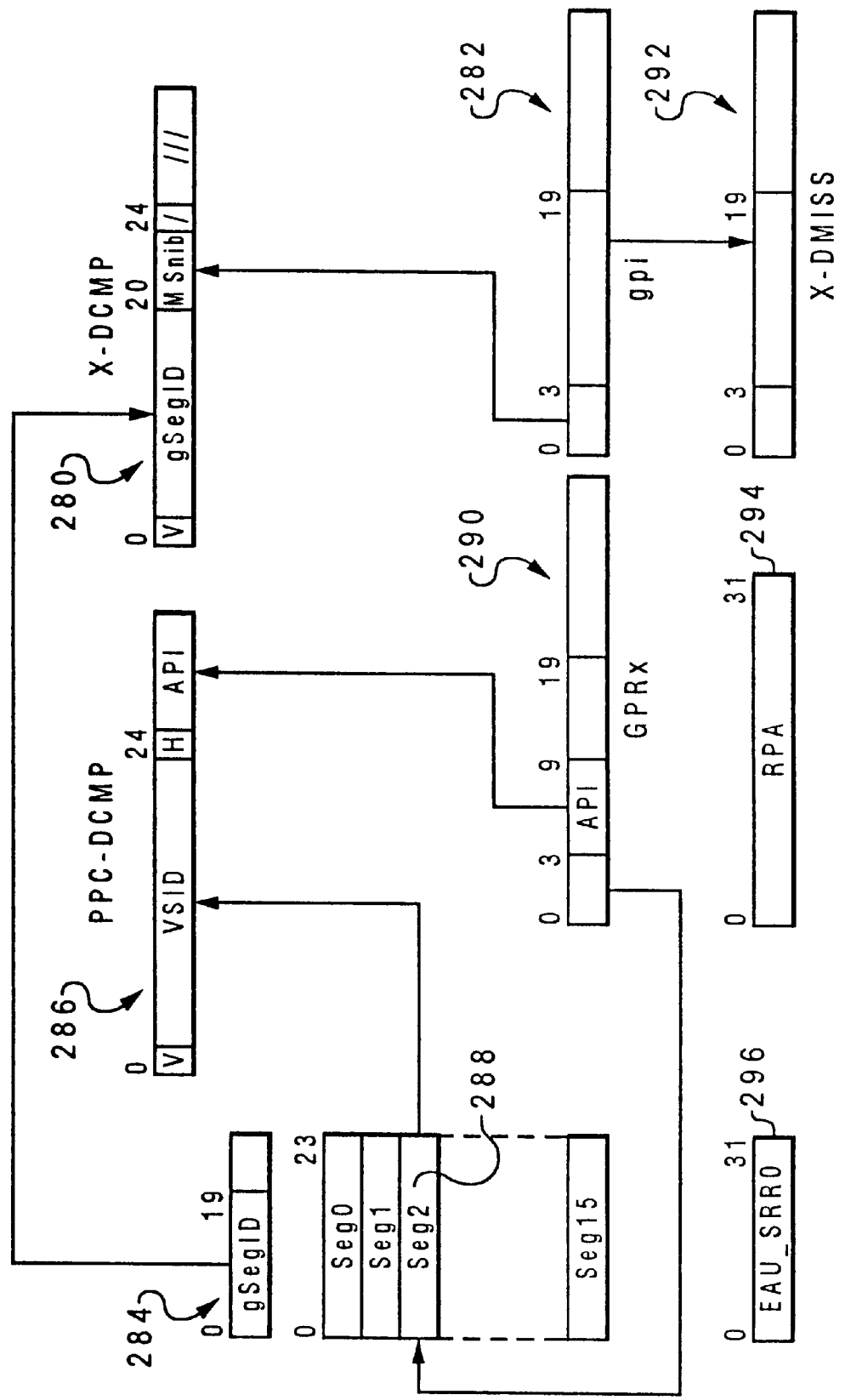
FIG. 9 is a diagram of certain registers used in the address translation scheme illustrated in FIGS. 7 and 8.

With reference now to FIG. 8, a high level logical flowchart is provided that illustrates how the process of guest address translation shown in FIG. 7 is preferably implemented within CPU 4. In the preferred embodiment, all guest storage accesses (i.e., guest instruction fetches, data loads, and data stores) are treated as data accesses by CPU 4, and are accordingly accessed using DMMU 56. The registers utilized by DMMU 56 to translate guest addresses are illustrated in FIG. 9.

As depicted in FIG. 8, the process of guest address translation begins at block 250 in response to receipt of a guest linear address by DMMU 56. DMMU 56 distinguishes between guest linear addresses and native effective addresses received as inputs by the presence (or absence) of a bit generated when the memory access instruction was decoded. The process proceeds from block 250 to block 252, which illustrates a determination of whether or not DTLB 57 contains a "guest" entry that maps the guest linear address to a native physical address. In a preferred embodiment, DTLB 57 contains both native entries as well as guest entries, which are marked, for example, with an "X" bit set to one. However, in other embodiments, DTLB 57 may include separate TLBs for native and guest entries. In either case, the determination depicted at block 252 may be made, for example, by comparing the 32-bit guest linear address with the first 32 bits of each guest entry. In response to a hit in DTLB 57, the process proceeds from block 252 to block 253, which illustrates DMMU 56 utilizing the native real page address (described below) in the matching DTLB entry to calculate a native physical address. Next, as shown at block 254, DMMU 56 utilizes the native physical address to access the requested data within either data cache 34 or main memory 6. Thereafter, the process terminates at block 270.

Referring again to block 252, in response to a miss in DTLB 57, a guest DTLB miss exception is generated. Before branching to appropriate exception handler, hardware within CPU 4 saves the address of the semantic routine native instruction at which the DTLB miss exception occurred in one of SPRs 76 designated as EAU_SRRO 296. In a preferred embodiment, this native instruction address is contained in a completion buffer entry within completion unit 44. In addition, hardware saves the 20 high order bits of the guest linear address 180 that caused the DTLB miss in one of SPRs 76 designated as guest page index (GPI) register 282. Execution by CPU 4 then branches to a user-level exception handler located at a predetermined offset from the value stored in guest branch register (GBR) 298. In order to simplify the exception handling logic, the offset of the guest DTLB miss exception handler is preferably equal to the offset assigned to the native DTLB miss exception handler.

As illustrated at block 260 of FIG. 8, the guest DTLB exception handler utilizes the logical equivalent of the address translation process depicted in FIG. 6 to generate a guest real address 242 from the guest linear address stored in GPI register 282. The guest address 242 is then stored within a general purpose register GPRy. As indicated at block 262, a fixed offset value (which may be zero) is added to the guest real address to produce a native effective address, which is then stored in one of GPRs 60 designated as GPRx 290.

The process then proceeds from block 262 to block 264, which illustrates the execution of a "guest TLB load" (gtlbld) instruction in the exception handler routine. The gtlbld instruction is a newly defined operation in the native instruction set that builds the first word of a guest TLB entry. As illustrated in FIG. 9, the execution of the gtlbld instruction causes hardware within CPU 4 to load the conventional PPC-DCMP register 286 with bits 4–9 (the abbreviated page index (API)) of GPRx 290 and with the value stored in the native segment register 288 selected by the four most significant bits of GPRx 290. Thus, PPC-DCMP register 286 has the same format as the first word of a conventional native DTLB entry. The execution of the gtlbld instruction also causes the hardware of CPU 4 to load selected fields of (guest) X-DCMP register 280 with the 4 high order bits of GPI register 282 and with the 19-bit value of gSegID 284, which, similar to the virtual page numbers stored in native segment registers 288, specifies high order bits of a virtual page number assigned to guest instructions and data. The gtlbld instruction also loads X-DMISS register 292 with the content of GPI register 282, which stores the 20 high order bits of the guest linear address 180 that caused the DTLB miss. Finally, as illustrated at block 266 of FIG. 8, execution of the gtlbld instruction generates a hardware exception that invokes the conventional PowerPC™ supervisor-level page table walk routine. The page table walk routine determines the PowerPC™ (native) real page address to which the guest linear address maps and creates a guest entry in DTLB 57 to translate the guest linear address.

The table walk routine begins by comparing the value of PPC-DCMP register 286 against the first word of page table entries in memory (data cache 34 and main memory 6) until a match is found. In response to finding a matching entry in the page table, the supervisor-level table walk routine loads real page address (RPA) register 294 with the second word of the matching page table entry. A native TLB load (tlbld) instruction in the supervisor-level table walk routine is then executed. In response to the tlbld instruction, the hardware of CPU 4 selects an entry within DTLB 57, which preferably comprises a 32 entry 2-way set associative TLB array, utilizing bits 15–19 of X-DMISS register 292. In the illustrative embodiment, each DTLB entry comprises a first set including 36 bits and a second set containing 32 bits. As illustrated at block 268 of FIG. 8, the tlbld instruction then causes bits 1–23 of X-DCMP register 280 to be loaded into bits 2–24 of the first set of the selected DTLB entry, bits 4–14 of X-DMISS register 292 to be loaded into bits 25–35 of the first set of the selected DTLB entry, and the value of RPA register 294 to be loaded into the second set of the selected DTLB entry. To signify that the selected DTLB entry contains a guest address translation, the gtlbld instruction also sets an X bit, which in a preferred embodiment comprises bit 1 (i.e., the second most significant bit) of the first set of the selected DTLB entry. The supervisor-level table walk routine then executes a native "return from interrupt" (rfi) instruction and returns control to the user-level exception handler.

Thereafter, the user-level exception handler returns to the emulation of guest instructions utilizing the following sequence of native instructions:

mfspr GPRz, EAU_SRRO mtctr GPRz bcctr BO[0]=1

The mfspr ("move from SPR") instruction loads the effective address of the instruction at which the exception occurred from EAU_SRRO 296 into GPRz. The effective address is then transferred from GPRz into the PowerPC™ count register via the mtctr ("move to count register") instruction. The guest context of EAU 70 is then restored to its pre-exception state by executing the bcctr ("branch conditional to count register") instruction, which causes sequential fetcher 36 to resume fetching native instructions at the specified effective address (i.e., at the point where sequential fetcher 36 discontinued fetching native instructions in response to the DTLB miss exception). When the native instruction at which the exception occurred is again executed, the guest linear address is again passed to DMMU 56 for translation, as illustrated at block 252. This time the guest linear address hits in DTLB 57, and the process proceeds to block 253. Block 253 depicts the formation of the native physical address by concatenating the 19 high order bits of the second set of the matching DTLB entry (i.e., the real page number) with the 12-bit offset of the guest linear address. As depicted at block 254, DMMU 56 then performs the memory access utilizing the native real address. Thereafter, the process terminates at block 270.

While an illustrative embodiment of the present invention has been particularly shown and described, it will be understood by those skilled in the art that various changes in form and detail may be made therein without departing from the spirit and scope hereof. For example, while the present invention has been described with reference to embodiments in which the guest instructions emulated within CPU 4 are x86 CISC instructions, it should be understood that other guest instructions could alternatively be emulated.

What is claimed is:

1. A method of operating a processor which has a native instruction set and emulates instructions in a guest instruction set, said method comprising:

storing, in memory, a series of guest instructions from said guest instruction set, said series including a guest memory access instruction that indicates a guest logical address in guest address space;

for each guest instruction in said series, storing in memory a semantic routine of native instructions from said native instruction set to emulate each guest instruction, said native instructions utilizing native addresses in native address space;

in response to receipt of said guest memory access instruction for emulation, translating said guest logical address into a guest real address and thereafter translating said guest real address into a native physical address; and executing a semantic routine that emulates said guest memory access instruction utilizing said native physical address.

2. The method of claim 1, wherein said guest memory access instruction comprises one of a guest load instruction and a guest store instruction.

3. The method of claim 1, wherein said guest memory access instruction comprises a guest instruction that initiates fetching of a guest instruction in said series from memory.

4. The method of claim 1, wherein said step of executing a semantic routine that emulates said guest memory access instruction comprises the step of accessing said memory utilizing said native physical address.

5. The method of claim 1, said step of translating said guest real address into a native physical address includes the step of translating said guest real address into a native effective address and then translating said native effective address into said native physical address.

6. The method of claim 1, said processor including a translation lookaside buffer (TLB) containing entries utilized for address translation, wherein said step of translating said guest logical address into a guest real address and thereafter translating said guest read address into a native physical address comprises the steps of:

determining if said translation lookaside buffer includes an entry that can be utilized to obtain said native physical address; and in response to a determination that said translation lookaside buffer contains an entry that can be utilized to obtain said native physical address, translating said guest logical address into a guest real address and thereafter translating said guest read address into a native physical address utilizing said translation lookaside buffer (TLB) entry.

7. The method of claim 6, said method further comprising the step of:

in response to a determination that said translation lookaside buffer does not contain an entry that can be utilized to obtain said native physical address, creating an entry that can be utilized to obtain said native physical address in said translation lookaside buffer.

8. The method of claim 1, wherein said translating step performed utilizing a user-level semantic routine.

9. A processor which has a native instruction set and emulates instructions in a guest instruction set, said processor comprising:

guest instruction storage that stores guest instruction from a guest instruction set, wherein said series includes a guest access instruction that indicates a guest logical address in guest address space;

semantic routine storage that stores a plurality of semantic routines of native instructions for emulating said series of guest instructions;

means, responsive to receipt of said guest memory access instruction for emulation, for translating said guest logical address into a guest real address and for thereafter translating said guest real address into a native physical address; and means for executing a semantic routine that emulates said guest memory access instruction utilizing said native physical address.

10. The processor of claim 9, wherein said guest memory access instruction comprises one of a guest load instruction and a guest store instruction.

11. The processor of claim 9, wherein said guest memory access instruction comprises a guest instruction that initiates fetching of a guest instruction in said series from said associated memory.

12. The processor of claim 9, wherein said means for executing a semantic routine that emulates said guest memory access instruction comprises means for accessing said memory utilizing said native physical address.

13. The processor of claim 9, said means for translating said guest real address into a native physical address includes means for translating said guest real address into a native effective address and for then translating said native effective address into said native physical address.

14. The processor of claim 9, wherein:

said processor further comprising a translation lookaside buffer (TLB) containing entries utilized for address translation; and said means for translating said guest logical address into a guest real address and for thereafter translating said guest read address into a native physical address includes:

means for determining if said translation lookaside buffer includes an entry that can be utilized to obtain said native physical address; and means, responsive to a determination that said translation lookaside buffer contains an entry that can be utilized to obtain said native physical address, for translating said guest logical address into a guest real address and for thereafter translating said guest read address into a native physical address utilizing said translation lookaside buffer (TLB) entry.

15. The processor of claim 14, and further comprising:

means, responsive to a determination that said translation lookaside buffer does not contain an entry that can be utilized to obtain said native physical address, for creating an entry that can be utilized to obtain said native physical address in said translation lookaside buffer.

16. The processor of claim 9, wherein said means for translating includes means for executing a user-level semantic routine.

* * * * *

UNITED STATES PATENT AND TRADEMARK OFFICE
CERTIFICATE OF CORRECTION

PATENT NO. : 5,953,520
DATED : September 14, 1999
INVENTOR(S) : Soummya Mallick

It is certified that error appears in the above-indentified patent and that said Letters Patent is hereby corrected as shown below:

Col. 17, Line 10 please insert after "guest" --memory--.

Signed and Sealed this

Fifteenth Day of August, 2000

Attest:

Q. TODD DICKINSON

*Attesting Officer*        *Director of Patents and Trademarks*